US005876542A

United States Patent [19]

Fujiwara

[11] Patent Number: 5,876,542

[45] Date of Patent: Mar. 2, 1999

[54] GAS DISCHARGE DISPLAY PANEL AND ITS FABRICATION METHOD

[75] Inventor: Shinya Fujiwara, Kyoto, Japan

[73] Assignee: Matsushita Electronics Corporation, Osaka, Japan

[21] Appl. No.: 634,375

[22] Filed: Apr. 18, 1996

[30] Foreign Application Priority Data

Apr. 20, 1995 [JP] Japan .................................... 7-094852
Apr. 20, 1995 [JP] Japan .................................... 7-094853

[51] Int. Cl.[6] ...................................................... B32B 31/00

[52] U.S. Cl. .......................... 156/107; 156/148; 156/292; 445/24; 445/25

[58] Field of Search .................................... 156/107, 109, 156/145, 292; 445/24, 25

[56] References Cited

U.S. PATENT DOCUMENTS

| | | | |
|---|---|---|---|
| 3,837,724 | 9/1974 | Haberland | 445/25 |
| 3,873,171 | 3/1975 | Miyamoto et al. | 313/514 |
| 5,601,468 | 2/1997 | Fujii et al. | 445/24 |

FOREIGN PATENT DOCUMENTS

| | | |
|---|---|---|
| 62-195829 | 8/1987 | Japan . |
| 2-242548 | 9/1990 | Japan . |
| 2-301934 | 12/1990 | Japan . |
| 4-282531 | 10/1992 | Japan . |
| 5-266-791 | 10/1993 | Japan . |
| 7-45190 | 2/1995 | Japan . |
| 7-161298 | 6/1995 | Japan . |

OTHER PUBLICATIONS

Communication from European Patent Office and attached Search Report, Mar. 1998.

*Primary Examiner*—Francis J. Lorin
*Attorney, Agent, or Firm*—Merchant, Gould, Smith, Edell, Welter & Schmidt, P.A.

[57] ABSTRACT

A gas discharge display unit having a partition wall structure which is useful for forming discharge cells suitable for the color image display with high precision is provided. A plurality of cathode electrodes are formed on a front panel. A plurality of anode buses, anode electrodes, auxiliary electrodes and resistors are formed on a back plate. A layer insulating film is formed on the back plate where the anode buses, the anode electrodes and the resistors are provided except for a display electrode portion. A display electrode is formed on the upper face of the anode electrode. Then, a three-layered insulating layer having differing quantities of a resin binder is formed on the layer insulating film. Unnecessary portions are removed by a sand blasting step to form partition walls comprised of partition layers. A phosphor is applied onto the layer insulating film in a discharge cell except for the display electrode portion. The front plate is joined to the back plate with the partition walls held therebetween in such a manner that the cathode ray tube is orthogonal to the anode bus.

13 Claims, 13 Drawing Sheets

F/G. 4

GAS DISCHARGE DISPLAY PANEL AND ITS FABRICATION METHOD

FIELD OF THE INVENTION

The present invention generally relates to a gas discharge display unit for displaying characters and images by utilizing gas discharge and a method for manufacturing the same, and more particularly to the structure of a partition wall forming a discharge cell and a method for manufacturing the same.

BACKGROUND OF THE INVENTION

Recently, a gas discharge display unit (plasma display panel) has been utilized as a plane-type display unit for an information terminal such as a portable computer. The gas discharge display unit has been applied widely because the display is clear and the angle of visibility is greater than that of a liquid crystal panel.

Furthermore, the size of a television picture receiver has been increased so that a projection-type television using a projection cathode ray tube or a liquid crystal panel has been marketed. However, the brightness of the screen and the size of the device have caused problems.

On the other hand, the coloring technology of the gas discharge display unit has recently been developed remarkably. The depth of the unit can be reduced more than that of the cathode ray tube. Consequently, attention has been paid to the gas discharge display unit as the best wall-type television for high visibility. In addition, it is expected that colors will be accurately reproduced and that brightness and lifetime will be enhanced.

An example of a memory driving type DC gas discharge display unit according to the prior art will be described below with reference to FIG. 8. As shown in FIG. 8, a plurality of stripe-shaped cathode electrodes 22 are formed on a front plate 21, which is made of a transparent glass or the like. A plurality of stripe-shaped anode buses 24*a* are formed on a back plate 23, which is made of a transparent glass or the like. The front plate 21 is opposed to the back plate 23 with a plurality of partition walls 25 held therebetween in such a manner that the cathode electrodes 22 are orthogonal to the anode buses 24*a*. Thus, a lot of discharge cells 26, which are surrounded by the partition walls 25, are formed like a matrix. The peripheral portions of the front plate 21 and the back plate 23, which are combined, are sealed by a low melting point glass or the like. Discharge gases whose main component is an inert gas are filled in the discharge cell 26.

Anode electrodes 24*b* are individually formed corresponding to respective discharge cells 26 on the back plate 23. A display electrode 27 is formed on each anode electrode 24*b* in the discharge cell 26. The display electrode 27 is connected to the anode bus 24*a* by a resistor 28. Thus, a pair of discharge electrodes are formed in the discharge cell 26 by the cathode electrodes 22 and the display electrode (anode) 27. In FIG. 8, the reference numeral 31 designates an auxiliary electrode for generating auxiliary discharge so as to easily start discharge in the discharge cell 26.

A layer insulating film 30 is formed on the back plate 23, except for the display electrode 27 portion, on which the anode bus 24*a*, the anode electrode 24*b* and the resistor 28 are formed. Consequently, discharge can be prevented from occurring between a plasma in the discharge cell 26 and the anode bus 24*a* or resistor 28. A phosphor 29 is applied onto the layer insulating film 30 in the discharge cell 26 except for the display electrode 27 portion.

The front plate 21 is transparent except for the cathode electrode 22 portion. The surface of the phosphor 29 can be directly observed through the discharge cell 26.

The cathode electrode 22, the anode bus 24*a*, the anode electrode 24*b*, the display electrode 27, the resistor 28, the layer insulating film 30, the phosphor 29, the partition wall 25 and the like are formed, by thick film printing technology, on the front plate 21 or the back plate 23 which is made of the glass plate or the like.

In order to increase the pixel density and reproduce the finer images in the above structure similarly to the high visibility television, it is necessary to form partition walls forming discharge cells hyperfinely. More specifically, the partition wall having a height of 160 to 200 $\mu$m and a width of 50 to 60 $\mu$m should be formed. In particular, 1 dot should be formed by three discharge cells R, G and B in order to display color images. Hence, if fine images are to be displayed, it is necessary to form partition walls having a very small size and highly precise dimensions.

A method for forming the partition walls of a gas discharge display unit according to the prior art will be described with reference to the drawings. FIGS. 9(*a*) to 9(*c*) are views showing the steps of forming partition walls in the gas discharge display unit according to the prior art. FIG. 10 is a view schematically showing the sand blasting step. In FIGS. 9(*a*) to 9(*b*) and 10, the components that are not related to the formation of partition walls are omitted.

As shown in FIG. 9(*a*), a rib paste 32 for forming a partition wall 25 is applied, by the knife coating method, onto a back plate 23 made of a transparent glass or the like on which an anode electrode 24*b* is formed. Then, the rib paste 32 is dried and solidified. Then, a photosensitive film 33 is fixed onto the rib paste 32 as shown in FIG. 9(*b*). Thereafter, ultraviolet rays are irradiated on the photosensitive film 33 through an exposure mask on which partition patterns are formed, and the sensitized portion is developed and removed to form a mask pattern 34 as shown in FIG. 9(*c*). As shown in FIG. 9(*d*), abrasive particles such as glass beads are jetted on the rib paste 32 by means of a sand blasting device having a jet gun 35. Consequently, the rib paste 32 is cut except for the portion on which the mask pattern 34 is formed. Finally, the mask pattern 34 is removed by using a peeling agent as shown in FIG. 9(*e*). Thus, the partition walls (25) are formed on the back plate 23.

As shown in FIG. 10, the back plate 23 is moved in one direction and the sand blasting device (jet gun 35) reciprocates in the direction perpendicular to the direction of movement of the back plate 23 above the mask pattern 34 on the back plate 23. In this state, the abrasive sand such as glass beads are jetted through the nozzle of the jet gun 35. Consequently, the rib paste 32 on the portion where the mask pattern 34 is not formed is cut and removed.

In order to fabricate the gas discharge display unit according to the prior art, a material for the partition wall is applied over the whole glass substrate by the thick film printing technology, and unnecessary portions are removed at the sand blasting step so that the partition wall is formed. In other words, the material for the partition wall should have the following characteristics: (1) adhesion to the glass substrate, (2) cutting properties for the sand blasting step, (3) adhesion to a resist for a mask during sand blasting, (4) durability against a peeling agent used for peeling and removing the resist after the rib paste is cut, and the like. However, it is very hard for the material for the partition wall material according to the prior art to satisfy all these characteristics.

According to the partition wall having the above structure and the method for manufacturing the same, the shape and dimension of the partition wall have limitations, that is, a width of (100±10) μm and a height of (200±5) μm. In addition, the pitch of the discharge cells is at best (650±10) μm. Accordingly, it is very hard to form fine partition walls and discharge cells having high densities for forming pixels that can reproduce images with high precision.

According to the method for manufacturing the gas discharge display unit according to the prior art, the rib paste is generally cut and removed by sand blasting by means of a sand blasting device having a jet gun. FIG. 11 shows the influence on the cutting rate of the rib paste and the amount of side etching of the partition wall by the jet pressure of the abrasive sand which is applied during sand blasting by means of the jet gun. FIG. 12 shows the influence on the cutting rate of the rib paste and the amount of side etching of the partition wall exerted by the distance between the rib paste and the jet gun (jet distance). As shown in FIG. 11, when a jet pressure P is raised, a cutting rate Rs of the rib paste is increased and the amount Es of side etching of the partition wall is increased at a greater ratio than the cutting rate Rs. If the jet pressure P is set to a relative value having a smaller amount Es of side etching, i.e., 3 or less so that the injection distance must be reduced so as to raise the cutting rate Rs, the amount of side etching is increased again as shown in FIG. 12. As shown in FIG. 13(*a*), the partition wall 25 should have a rectangular shape in section. However, the partition wall 25 has a concave curved face so that the width of the section on the central portion thereof is reduced. For this reason, the precision and strength of the partition wall are reduced.

SUMMARY OF THE INVENTION

It is an object of the present invention to provide a gas discharge display unit having a partition wall structure that is useful for the formation of a discharge cell that is suitable for color image display with high precision, and a method for manufacturing the same.

In order to accomplish the above object, the present invention provides a gas discharge display unit comprising a first substrate, a first electrode formed on the first substrate, a second substrate opposed to the first substrate, a second electrode formed on the second substrate, partition walls formed between the first and second substrates to form discharge cells, and discharge gases filled in the discharge cells, wherein the partition walls are formed by a three-layered structure comprised of first, second and third partition wall layers which are laminated sequentially from the second substrate side. According to the structure of the gas discharge display unit, the adhesion of the partition wall to the second substrate can be enhanced by the first partition wall layer and the durability of the partition wall against a resist peeling agent can be improved. In addition, excellent cutting properties for the sand blasting step can be provided by the second partition wall layer. Furthermore, the adhesion of the partition wall to a resist which acts as a mask during sand blasting can be enhanced by the third partition wall layer.

According to the structure of the gas discharge display unit of the present invention, it is preferred that the partition wall is formed from a first partition wall layer whose main components are 1.0 to 3.0% by weight of a resin binder and a glass frit, a second partition wall layer whose main components are 0.5 to 1.5% by weight of a resin binder and a glass frit, and a third partition wall layer whose main components are 2.0 to 5.0% by weight of a resin binder and a glass frit, which are sequentially laminated and sintered at a predetermined temperature. According to the preferred example, the following functions can be obtained. Since the amount of the resin binder contained in the third partition wall layer is relatively large, the adhesion of the partition wall to the resist for a mask pattern is excellent. In addition, the cutting rate is comparatively small so that the opening portion of the discharge cell can be cut precisely in the first stage of sand blasting. In addition, the amount of the resin binder contained in the second partition wall layer is reduced as much as possible. Consequently, the cutting rate is very great so that the throughput of a manufacturing apparatus can be enhanced. The amount of the resin binder contained in the first partition wall layer is a little greater than in the second partition wall layer. Consequently, the adhesion of the partition wall to the second substrate can be enhanced. As a result, there is no possibility that the peeling agent enters and damages a portion between the partition wall and the second substrate at the step of removing the resist on the partition wall after the sand blasting step is completed. In this case, it is preferred that the resin binder is a cellulose polymeric binder. According to the preferred example, when the partition wall is sintered, the resin binder does not remain in the partition wall. Consequently, impurity gases are not generated by the resin binder after the gas discharge display unit is finished.

According to the structure of the gas discharge display unit of the present invention, it is preferred that the first partition wall layer has a thickness of 5 to 15 μm, the second partition wall layer has a thickness of 100 to 250 μm, and the third partition wall layer has a thickness of 5 to 30 μm. According to the preferred example, the amount of side etching of the partition wall can be reduced significantly even if the cutting rate is increased.

According to the structure of the gas discharge display unit of the present invention, it is preferred that an insulating film is formed on the second substrate and the partition walls are formed between the first substrate and the insulating film. According to the preferred example, the discharge can be prevented from occurring between the discharge gas filled in the discharge cell and the second electrode.

According to the structure of the gas discharge display unit of the present invention, it is preferred that the first electrode is formed by a cathode electrode, the second electrode is formed by an anode bus, an anode electrode connected to the anode bus through a resistor, and a display electrode provided on the anode electrode, an insulating film is formed on the second substrate except for the display electrode portion, and the partition walls are formed between the first substrate and the insulating film.

In the structure of the gas discharge display unit of the present invention, it is preferred that the second partition wall layer has a layered structure in which a plurality of partition wall films are laminated. According to the preferred example, the following functions can be obtained. If the material structure of each partition wall film (i.e., the amount of the resin binder which is contained) is changed, and the cutting rate is reduced in the vicinity of the center of the second partition wall layer and is gradually increased apart from the center of the second partition wall layer, precise processing can be performed while preventing the side etching of the partition wall having the small shape and dimension as much as possible.

In the structure of the gas discharge display unit of the present invention, it is preferred that the third partition wall layer is made of a black material. According to the preferred example, it is possible to prevent halation from occurring during resist exposure when forming the mask pattern for sand blasting. As a result, the precise mask pattern can be formed so that the fine and precise partition wall necessary for discharge cell formation to display images with high precision can be formed. In addition, the black paste functions as a black matrix when the finished gas discharge display unit reproduces images. Consequently, the contrast of the displayed images can be enhanced.

The present invention provides a method for manufacturing a gas discharge display unit having a first substrate, a first electrode formed on the first substrate, a second substrate opposed to the first substrate, a second electrode formed on the second substrate, partition walls formed between the first and second substrates to form discharge cells, comprising the steps of forming the second electrode on the second substrate, forming an insulating layer on the second substrate on which the second electrode has been provided, forming a mask pattern having sand forming partition walls by removing the insulating layer on a portion where the mask pattern is not provided by means of a sand blasting device having a plurality of jet guns while controlling the cutting rates of the plurality of jet guns. According to the method for manufacturing a gas discharge display unit, a plurality of jet guns are provided in the direction of movement of the second substrate. The cutting rate of each jet gun is adjusted so as to be decreased sequentially in the direction of movement of the second substrate. Consequently, the amount of side etching of the partition wall can be controlled as much as possible and the throughput of a manufacturing apparatus can be increased. The insulating layer on a specific portion is cut and removed with a cutting rate that is gradually decreased. As a result, the amount of side etching of the partition wall is reduced. Since the sand blasting device having a plurality of jet guns is used, the throughput of the manufacturing apparatus is not lowered.

In the method for manufacturing a gas discharge display unit of the present invention, it is preferred that the present invention further comprises the step of forming an insulating film on the second substrate before forming an insulating layer so that the insulating layer is formed on the insulating film.

According to the method for manufacturing a gas discharge display unit of the present invention, it is preferred that the second electrode includes an anode bus, an anode electrode connected to the anode bus through a resistor, and a display electrode formed on the anode electrode, further comprising the step of forming an insulating film on the second substrate except for the display electrode so that the insulating layer is formed on the insulating film.

According to the method for manufacturing a gas discharge display unit of the present invention, it is preferred that the insulating layer is formed of first, second and third insulating layers laminated sequentially from the second substrate side. In this case, it is preferred that the first insulating layer made of a material whose main components are 1.0 to 3.0% by weight of a resin binder and a glass frit, the second insulating layer made of a material whose main components are 0.5 to 1.5% by weight of a resin binder and a glass frit, and the third insulating layer made of a material whose main components are 2.0 to 5.0% by weight of a resin binder and a glass frit are laminated and sintered at a predetermined temperature. In this case, it is preferred that first insulating layer is formed with a thickness of 5 to 15 μm, the second insulating layer is formed with a thickness of 100 to 250 μm, and the third insulating layer is formed with a thickness of 5 to 30 μm. Furthermore, it is preferred that the second insulating layer is formed by laminating a plurality of insulating layers. Preferably, the third insulating layer is made of a black material.

According to the method for manufacturing a gas discharge display unit of the present invention, it is preferred that the jet pressures of the jet guns are varied. According to the preferred example, it is possible to remove the insulating layer on a portion where the mask pattern is not formed while controlling the cutting rates of the jet guns.

According to the method for manufacturing a gas discharge display unit of the present invention, it is preferred that the the nozzle calibers of the jet guns are varied. According to the preferred example, it is possible to remove the insulating layer on a portion where the mask pattern is not formed while controlling the cutting rates of the jet guns.

According to the method for manufacturing a gas discharge display unit of the present invention, it is preferred that the distances between the nozzle tips of the jet guns and the surface substance on the substrate are varied. According to the preferred example, it is possible to remove the insulating layer on a portion where the mask pattern is not formed while controlling the cutting rates of the jet guns.

According to the method for manufacturing a gas discharge display unit of the present invention, it is preferred that the average particle sizes of abrasive particles jetted from the jet guns are different from one another. According to the preferred example, it is possible to remove the insulating layer on a portion where the mask pattern is not formed while controlling the cutting rates of the jet guns.

According to the method for manufacturing a gas discharge display unit of the present invention, it is preferred that the second substrate is moved relative to the sand blasting device in a first direction, the sand blasting device comprises a plurality of jet nozzles arranged in the first direction, and the cutting rates of the plurality of jet nozzles decrease in the first direction.

According to the gas discharge display unit of the present invention described above, the adhesion of the partition wall to the second substrate can be enhanced by the first partition wall layer and the durability of the partition wall against a resist peeling agent can be improved. In addition, excellent cutting properties for the sand blasting step can be obtained by the second partition wall layer. Furthermore, the adhesion of the partition wall to a resist which acts as a mask during sand blasting can be enhanced.

Furthermore, the partition wall having fine and accurate shape and dimension can be formed easily without side etching and without lowering the throughput of the manufacturing apparatus.

DETAILED DESCRIPTION OF THE INVENTION

Preferred embodiments of the present invention will be described below in more detail.

<First Embodiment>

Figure 1:
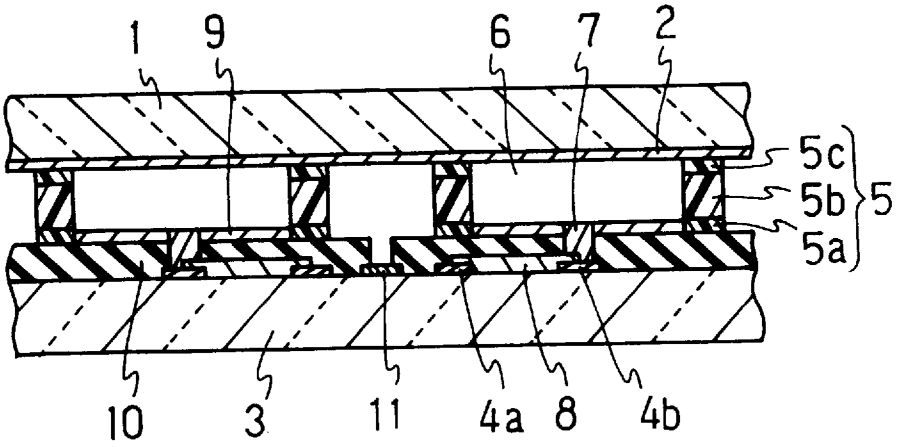
FIG. 1 is a partially sectional view showing a gas discharge display unit according to a first embodiment of the present invention.
Figure 2A:
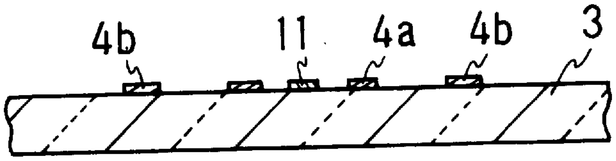
FIGS. 2(*a*) to 2(*e*) are views showing the steps of manufacturing the gas discharge display unit according to the first embodiment of the present invention.
Figure 2B:
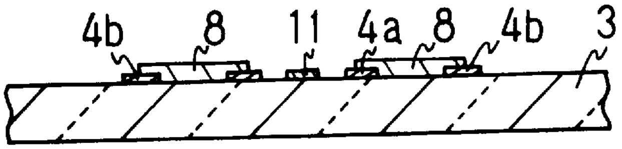
Figure 2C:
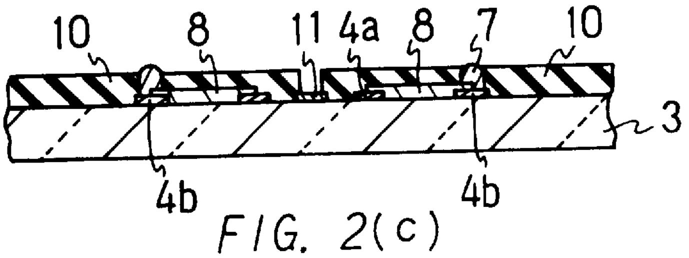
Figure 2D:
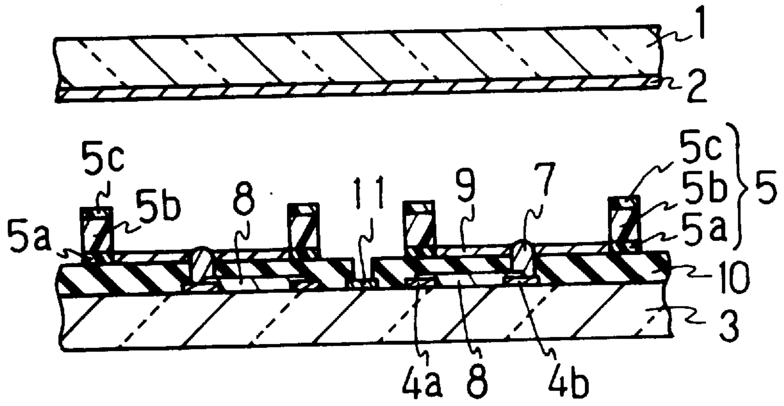
Figure 2E:
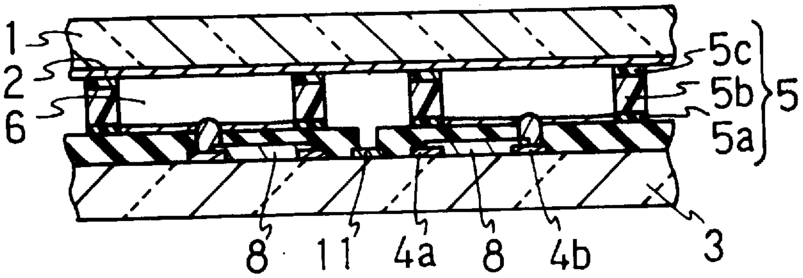

FIG. 1 is a partially sectional view showing a gas discharge display unit according to a first embodiment of the present invention. As shown in FIG. 1, a plurality of stripe-shaped cathode electrodes 2 are formed on a front plate 1 made of a transparent glass or the like. A plurality of stripe-shaped anode buses 4*a* are formed on a back plate 3 made of a transparent glass or the like. The front plate 1 is opposed to the back plate 3 with a plurality of partition walls 5 held therebetween in such a manner that the cathode electrode 2 is orthogonal to the anode bus 4*a*. Consequently, a number of discharge cells 6, which are surrounded by the partition walls 5, are formed like a matrix. The peripheral portions of the front plate 1 and the back plate 3, which are combined, are sealed by a low melting point glass or the like. Discharge gases whose main component is an inert gas are filled in the discharge cell 6.

Anode electrodes 4*b* are individually formed corresponding to respective discharge cells 6 on the back plate 3. A display electrode 7 is formed on each anode electrode 4*b* in the discharge cell 6. The display electrode 7 is connected to the anode bus 4*a* through a resistor 8. Thus, a pair of discharge electrodes are formed by the cathode electrode 2 and the display electrode (anode) 7 in the discharge cell 6. In FIG. 1, the reference numeral 11 designates an auxiliary anode for generating an auxiliary discharge so as to easily start the discharge in the discharge cell 6.

A layer insulating film 10 is formed on the back plate 3 on which the anode buses 4*a*, the anode electrodes 4*b* and the resistors 8 are formed except for the display electrode 7 portion. Consequently, discharge can be prevented from occurring between a plasma in the discharge cell 6 and the anode bus 4*a* or resistor 8. A phosphor 9 is applied onto the layer insulating film 10 in the discharge cell 6 except for the display electrode 7 portion.

The partition wall 5 has a three-layered structure in which first, second and third partition wall layers 5*a*, 5*b* and 5*c* are formed sequentially from the back plate 3 side. For this reason, the adhesion of the partition wall 5 to the layer insulating film 10 can be enhanced by the first partition wall layer 5*a* and the durability of the partition wall 5 against a resist peeling agent can be improved. In addition, it is possible to obtain good cutting properties for the sand blasting step in the second partition wall layer 5*b*. Furthermore, the adhesion of the partition wall 5 to a resist which acts as a mask during sand blasting can be enhanced by the third partition wall layer 5*c*.

A method for manufacturing a gas discharge display unit according to a first embodiment of the present invention will be described below.

FIG. 2 shows the method for manufacturing a gas discharge display unit according to the first embodiment of the present invention. As shown in FIG. 2(*a*), a plurality of stripe-shaped anode buses 4*a*, anode electrodes 4*b* and auxiliary anodes 11 are formed on the back plate 3 made of a transparent glass which has a thickness of 3 mm by the screen printing method and the photolithographic method. The anode bus 4*a*, the anode electrode 4*b* and the auxiliary anode 11 have a thickness of 5 μm and a width of 80 μm. As shown in FIG. 2(*b*), a $RuO_2$ paste is applied in a thickness of 20 μm between the anode bus 4*a* and the anode electrode 4*b*. The $RuO_2$ paste is sintered at a temperature of about 520° to 600° C. to form a resistor 8. As shown in FIG. 2(*c*), a glass paste is applied in a thickness of 35 μm on the back plate 3 except for an opening portion for the display electrode 7 and a part of the auxiliary electrode 11. The glass paste is sintered at a temperature of about 520° to 600° C. to form a layer insulating film 10. Then, the display electrode 7 is formed on the upper face of the anode electrode 4*b*. As shown in FIG. 2(*d*), a film is formed in a thickness of 10 μm on the layer insulating film 10 by using a material whose main components are 1.0 to 3.0% by weight of a cellulose polymeric binder and a glass frit. Thus, a first insulating layer is formed. Then, a film is formed in a thickness of 200 to 210 μm on the first insulating film by using a material whose main components are 0.5 to 1.5% by weight of the cellulose polymeric binder and the glass frit. Thus, a second insulating layer is formed. Thereafter, a film is formed in a thickness of 10 to 20 μm on the second insulating film by using a material whose main components are 2.0 to 5.0% by weight of the cellulose polymeric binder and the glass frit. Thus, a third insulating layer is formed. Examples of the cellulose polymer are methyl cellulose, ethyl cellulose, propyl cellulose, hydroxymethyl cellulose, hydroxyethyl cellulose, hydroxypropyl cellulose, hydroxymethylpropyl cellulose, hydroxyethylpropyl cellulose and the like. After the three-layered product is formed as described above, unnecessary portions of the three-layered product are etched and removed through a mask pattern by the sand blasting method. Then, the three-layered product thus obtained is sintered at a temperature of about 500° to 550° C. so that the partition wall 5 comprised of the first, second and third partition wall layers 5*a*, 5*b* and 5*c* is formed on the layer insulating film 10. Then, the phosphor 9 is applied in a thickness of 20 μm onto the insulating film layer 10 between the partition walls 5 except for the display electrode 7 portion. A plurality of stripe shaped cathode electrodes 2 are formed on the front plate 1 made of a transparent glass or the like by the screen printing method and the photolithographic method. The cathode electrode 2 has a thickness of 35 μm and a width of 170 μm (see FIG. 2(*d*)). As shown in FIG. 2(*e*), the cathode electrode 2 side of the front plate 1 is opposed to the anode bus 4*a* side of the back plate 3 so that the front plate 1 is joined to the back plate 3 through the partition wall 5 in such a manner that the cathode electrode 2 is orthogonal to the anode bus 4*a*. Consequently, a number of discharge cells 6, which are surrounded by the partition walls 5, are formed like a matrix. Then, the peripheral portions of the front plate 1 and the back plate 3 are sealed by a low melting point glass or the like and evacuation is performed. Thereafter, discharge gases whose main component is an inert gas are filled in the discharge cell 6 by the well-known technology. Thus, a gas discharge display unit can be obtained.

Figure 3:
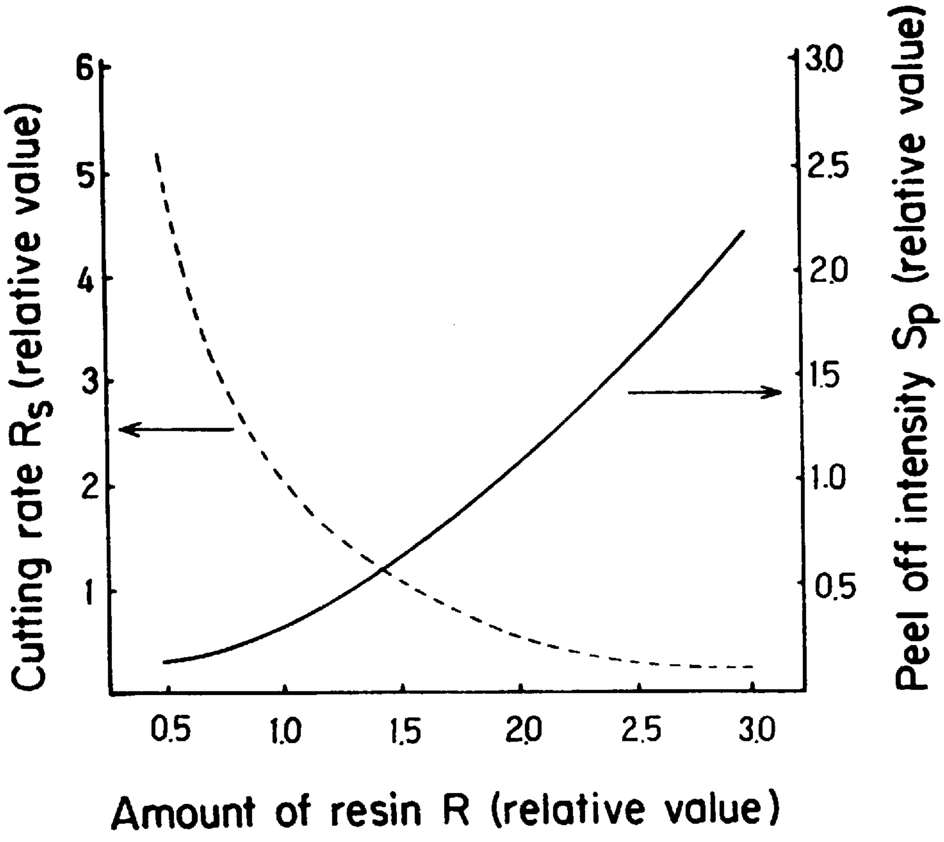
FIG. 3 is a graph showing the relationship between the amount of a cellulose polymeric binder contained in a partition wall material and a sand blasting cutting rate and adhesion according to the first embodiment of the present invention.

As shown in FIG. 3, the amount of the cellulose polymeric binder contained in the glass frit paste for forming the partition wall 5 influences the adhesion to the back plate 3 or the like and the cutting rate obtained during sand blasting. Accordingly, the amount of the cellulose polymeric binder contained in the partition wall 5 or the distribution thereof greatly influences the formation of the precise and fine partition walls 5.

More specifically, if the amount of the cellulose polymeric binder contained in the first partition wall layer 5*a* is less than 1.0% by weight, the adhesive strength to the back plate 3 and the layer insulating film 10 is decreased. If the amount of the cellulose polymeric binder contained in the first partition wall layer 5*a* is more than 3.0% by weight, the cutting rate is reduced too much during sand blasting so that the throughput of a manufacturing apparatus is lowered. If the amount of the cellulose polymeric binder contained in the second partition wall layer 5*b* is less than 0.5% by weight, the cutting rate is increased too much during sand blasting. Consequently, the amount of side etching of the partition wall 5 is increased and the adhesion of the second partition wall layer 5*b* to the first and third partition wall layers 5*a* and 5*c* becomes poor. If the amount of the cellulose polymeric binder contained in the second partition wall 5*b* is more than 1.5% by weight, the cutting rate is reduced too much during sand blasting so that the throughput of the manufacturing apparatus is lowered. If the amount of the cellulose polymeric binder contained in the third partition wall layer 5*c* is less than 2.0% by weight, the adhesion to the resist for sand blasting becomes poor so that the partition wall 5 is hard to process finely. If the amount of the cellulose polymeric binder contained in the third partition wall layer 5*c* is more 5.0% by weight, the cutting rate is reduced too much during sand blasting so that the throughput of the manufacturing apparatus is lowered. According to the experiments carried out by the inventors, if the first and third partition wall layers 5*a* and 5*c* have small thicknesses and the quantities of the cellulose polymeric binder contained in the first and third partition wall layers 5*a* and 5*c* are large, good results can be obtained.

According to the present embodiment described above, the amount of the cellulose polymeric binder contained in the third partition wall layer 5*c* is the largest. Consequently, the adhesion of the partition wall 5 to the resist for a mask pattern is excellent. In addition, the cutting rate is comparatively small so that the opening portion of the discharge cell can be cut precisely in the first stage of sand blasting. Furthermore, since the amount of the cellulose polymeric binder contained in the second partition wall layer 5*b* is reduced as much as possible, the cutting rate is greatly in creased so that the throughput of the manufacturing apparatus can be enhanced. The amount of the cellulose polymeric binder contained in the first partition wall layer 5*a* is larger than that of the second partition layer 5*b*. Consequently, the adhesion of the partition wall 5 to the layer insulating film 10 is enhanced. As a result, there is no possibility that the peeling agent enters and injures the portion between the partition wall 5 and the layer insulating film 10 at the step of removing the resist from the partition wall 5 after the sand blasting step is completed.

In the formation of the partition wall 5 at the sand blasting step, the cutting conditions for a sand blasting device and the partition wall materials to be cut should have different characteristics in the first, middle and final stages of the sand blasting step. According to the present embodiment, three kinds of partition wall layers having different material characteristics are laminated. Consequently, it is possible to perform ideal sand blasting without lowering the throughput of the manufacturing apparatus.

In order to enhance brightness, a white material is used for the first and second partition wall layers 5*a* and 5*b*. On the other hand, it is preferred that a black paste is used for the third partition wall layer 5*c*. By using the black paste for the third partition wall layer 5*c*, it is possible to prevent halation from occurring during resist exposure when forming the mask pattern for sand blasting. As a result, a precise mask pattern can be formed. Consequently, it is possible to form fine and precise partition walls which are necessary for the formation of discharge cells to display images with high precision. Furthermore, the black paste functions as a black matrix when the finished gas discharge display unit reproduces images. Hence, the contrast of displayed images can be enhanced.

While the first partition wall layer 5*a* has a thickness of 10 μm, the second partition wall layer 5*b* has a thickness of 200 to 210 μm, and the third partition wall layer 5*c* has a thickness of 10 to 20 μm in the present embodiment, the present invention is not limited thereto. If the first insulating layer 5*a* has a thickness of 5 to 15 μm, the second insulating layer 5*b* has a thickness of 100 to 250 μm and the third insulating layer 5*c* has a thickness of 5 to 30 μm, the same effects can be obtained.

<Second Embodiment>

Figure 4:
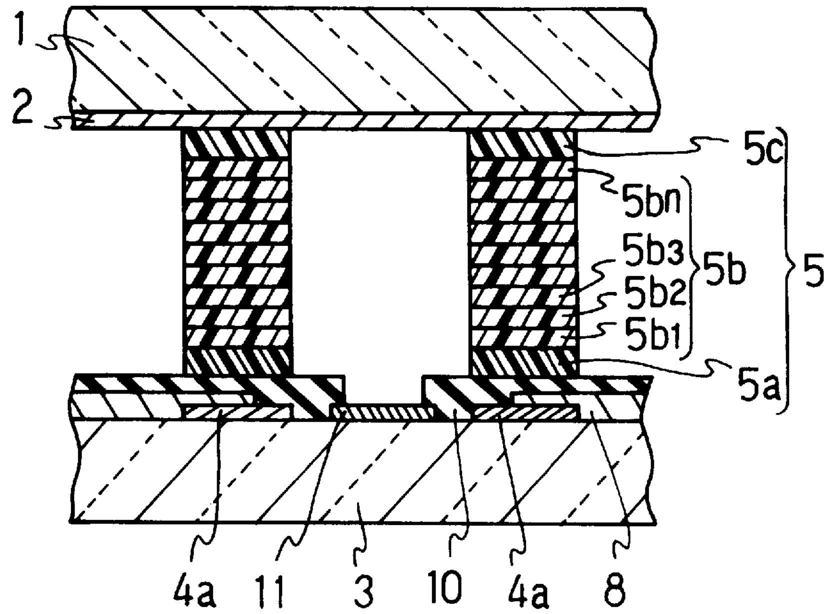
FIG. 4 is a partially sectional view showing a gas discharge display unit according to a second embodiment of the present invention.

FIG. 4 is a partially sectional view showing a gas discharge display unit according to a second embodiment of the present invention. As shown in FIG. 4, a plurality of partition wall films $5b_1$, $5b_2$, $5b_3$, . . . , $5b_n$ are laminated to form the second partition wall layer 5*b* according to the present embodiment. More specifically, a glass frit paste is applied onto the upper face of a first partition wall layer 5*a*. The glass frit paste is prepared by changing the amount of a cellulose polymeric binder, which is contained within the range of 0.5 to 1.5% by weight. Thus, the second partition wall layer 5*b* comprised of a plurality of partition wall films $5b_1$, $5b_2$, $5b_3$, . . . $5b_n$ is formed. In this case, the material compositions of the partition wall films $5b_1$, $5b_2$, $5b_3$, . . . , $5b_n$ and the number n of the partition wall films are properly selected depending on the size and shape of the discharge cell to be obtained, the use of the gas discharge display unit, and the like. Since other structures are the same as the structure of the first embodiment, the description will be omitted.

Thus, the second partition wall layer 5*b* has a lamination structure of the partition wall films $5b_1$, $5b_2$, $5b_3$, . . . , $5b_n$. Consequently, it is possible to process precisely the partition wall 5 having the fine shape and dimension while preventing side etching as much as possible.

While the cellulose polymeric binder has been used for forming the partition wall 5 in the first and second embodiments, a resin binder can be used. In this case, a polymer which produces the same effects can be used. Examples of the polymer are silicon polymer, polystyrene, butadiene/styrene copolymer, polyamide, high molecular weight polyether, ethylene oxide/propylene oxide copolymer, various acrylic polymers and the like.

While the partition walls are formed by the printing method in the first and second embodiments, a method using an insulator composition tape material, which is referred to as a green tape, can be adopted.

<Third Embodiment>

A sand blasting device for carrying out the sand blasting step will be described below.

Figure 5:
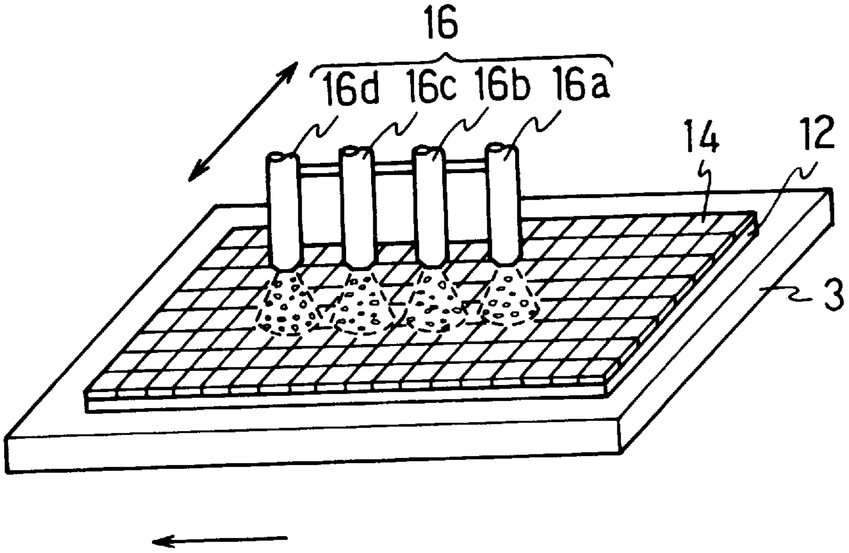
FIG. 5 is a perspective view schematically showing a sand blasting device used in a third embodiment of the present invention.

FIG. 5 is a perspective view schematically showing the sand blasting device used in a third embodiment of the present invention. As shown in FIG. 5, the sand blasting device according to the present embodiment comprises jet guns 16*a*, 16*b*, 16*c* and 16*d*. A back plate 3 moves in one direction. The sand blasting device (jet gun 16) reciprocates perpendicularly to the direction of movement of the back plate 3 above a mask pattern 14 on the back plate 3. In this state, abrasive particles such as glass beads are jetted from the nozzles of the jet guns 16*a*, 16*b*, 16*c* and 16*d* so that a rib paste 12 on a portion where the mask pattern 14 is not formed is cut and removed. The jet guns 16*a*, 16*b*, 16*c* and 16*d* are provided sequentially in the direction of movement of the back plate 3.

Figure 6:
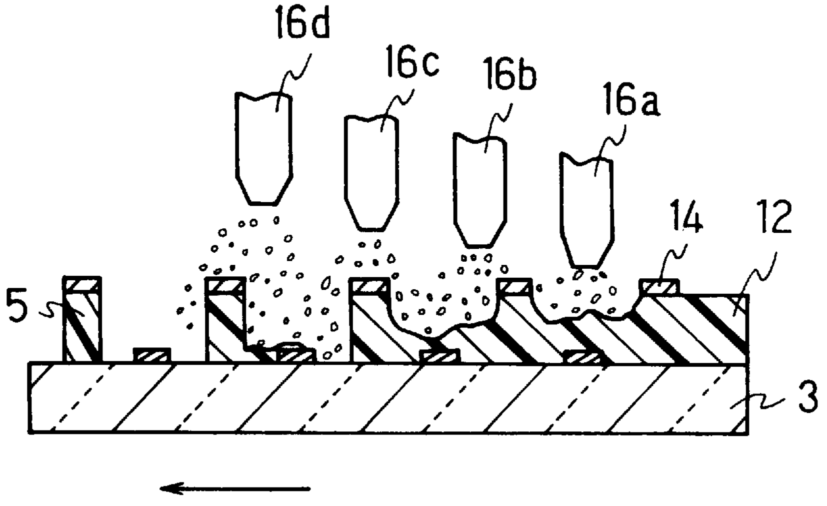
FIG. 6 is a sectional view showing a method for forming partition walls according to the third embodiment of the present invention.

FIG. 6 shows the cutting state obtained when using the sand blasting device having the above structure. As shown in FIG. 6, the rib paste 12 which is placed below the jet guns 16*a*, 16*b*, 16*c* and 16*d* is cut on different conditions. FIG. 6 shows the case where the cutting rates of the jet guns 16*a*, 16*b*, 16*c* and 16*d* are set at the different jet distances. It is also possible to adjust the cutting rates of the jet guns 16*a*, 16*b*, 16*c* and 16*d* by varying the jet pressure and nozzle caliber thereof or the average particle size of the abrasive sand.

If the sand blasting device is formed as described above to reduce the cutting rates of the jet guns 16*a*, 16*b*, 16*c* and 16*d* in this order, the amount of side etching of the partition wall 5 can be controlled to be smaller and the throughput of a manufacturing apparatus can be increased. In other words, the rib paste 12 on a specific portion is cut and removed at a cutting rate which is gradually decreased. Consequently, the amount of side etching of the partition wall 5 can be controlled to be smaller. Since the sand blasting device having the jet guns 16*a*, 16*b*, 16*c* and 16*d* is used, the throughput of the manufacturing apparatus is not lowered.

The jetting conditions for each jet gun according to the present embodiment will be described below.

(EXAMPLE 1)

When the nozzle caliber of the jet gun is fixed at 9 mm and the abrasive sand has an average particle size of 20 μm, the jet pressure of each jet gun is expressed by the following relative value.

Jet gun 16*a*: 4.0
Jet gun 16*b*: 2.5
Jet gun 16*c*: 1.0
Jet gun 16*d*: 0.5

(EXAMPLE 2)

When the jet pressure is constant (2 kg/cm$^2$) and the abrasive sand has an average particle size of 20 μm, the nozzle caliber of each jet gun is as follows.

Jet gun 16*a*: 6 mm
Jet gun 16*b*: 9 mm
Jet gun 16*c*: 12 mm
Jet gun 16*d*: 15 mm (EXAMPLE 3)

When the jet pressure is constant (2 kg/cm$^2$), the abrasive sand has an average particle size of 20 μm and the nozzle caliber of each jet gun is 9 mm, each jet distance is as follows.

Jet gun 16*a*: 50 mm
Jet gun 16*b*: 100 mm
Jet gun 16*c*: 150 mm
Jet gun 16*d*: 200 mm (EXAMPLE 4)

When the jet pressure is constant (2 kg/cm$^2$), the nozzle caliber is 9 mm and the jet distance is 100 mm, the average particle size of the abrasive sand is as follows.

Jet gun 16*a*: 15 μm
Jet gun 16*b*: 35 μm
Jet gun 16*c*: 60 μm
Jet gun 16*d*: 100 μm On a portion where the mask pattern for partition wall formation is not provided, the cutting rate is not influenced by the average particle size of the abrasive sand. On a portion surrounded by the mask pattern, the cutting rate is greater when the average particle size is smaller.

Figure 7:
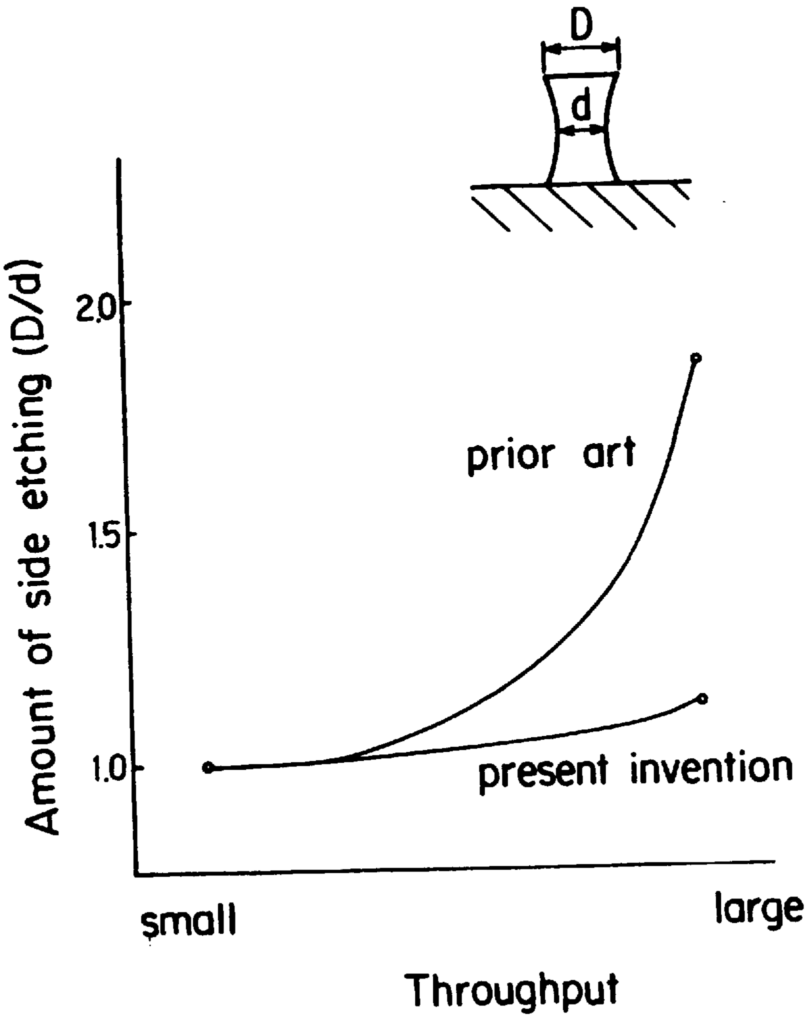
FIG. 7 is a graph showing the relationship between the amount of side etching of the partition wall and the throughput of a gas discharge display unit obtained in the third embodiment of the present invention.
Figure 8:
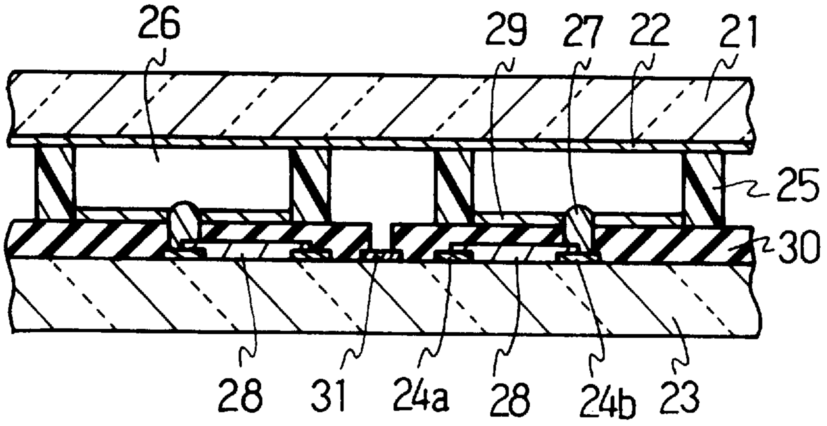
FIG. 8(PRIOR ART)
FIG. 8 is a partially sectional view showing a gas discharge display unit according to the prior art.
Figure 9A:
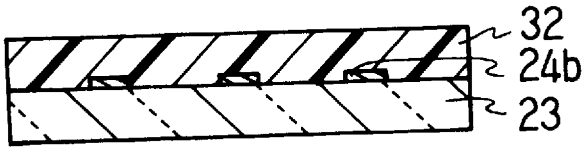
FIGS. 9(*a*) to 9(*e*) are views showing the steps of a method for manufacturing the gas discharge display unit according to the prior art.
Figure 9B:
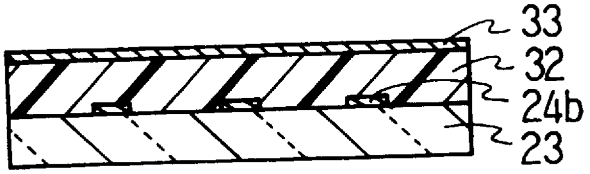
Figure 9C:
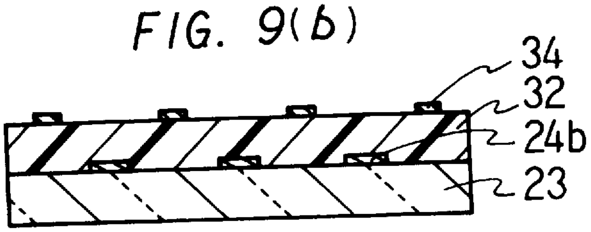
Figure 9D:
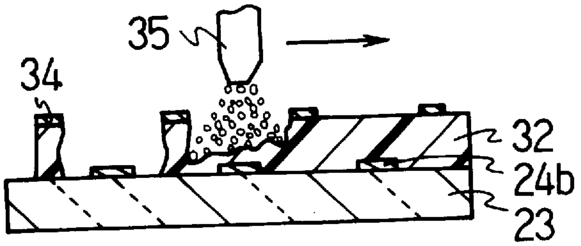
Figure 9E:
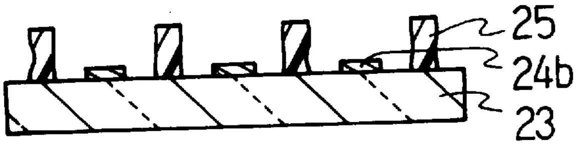
FIG. 9(e) (PRIOR ART)
Figure 10:
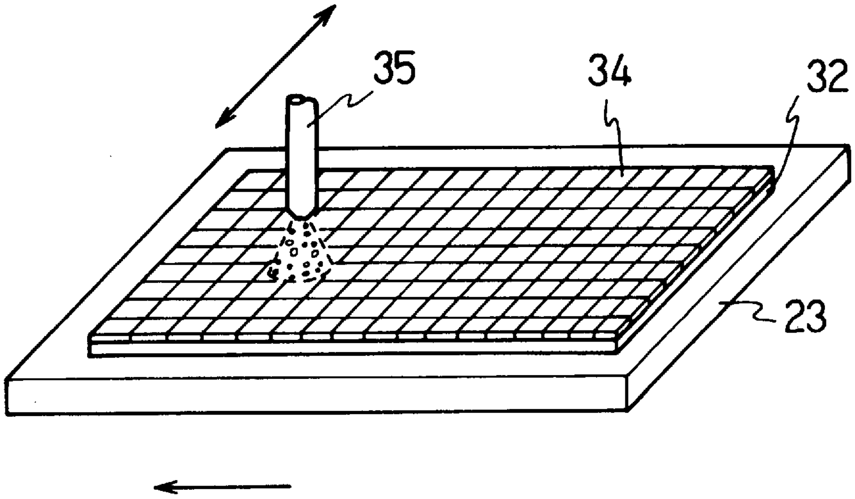
FIG. 10(PRIOR ART)
FIG. 10 is a view schematically showing the sand blasting step according to the prior art.
Figure 11:
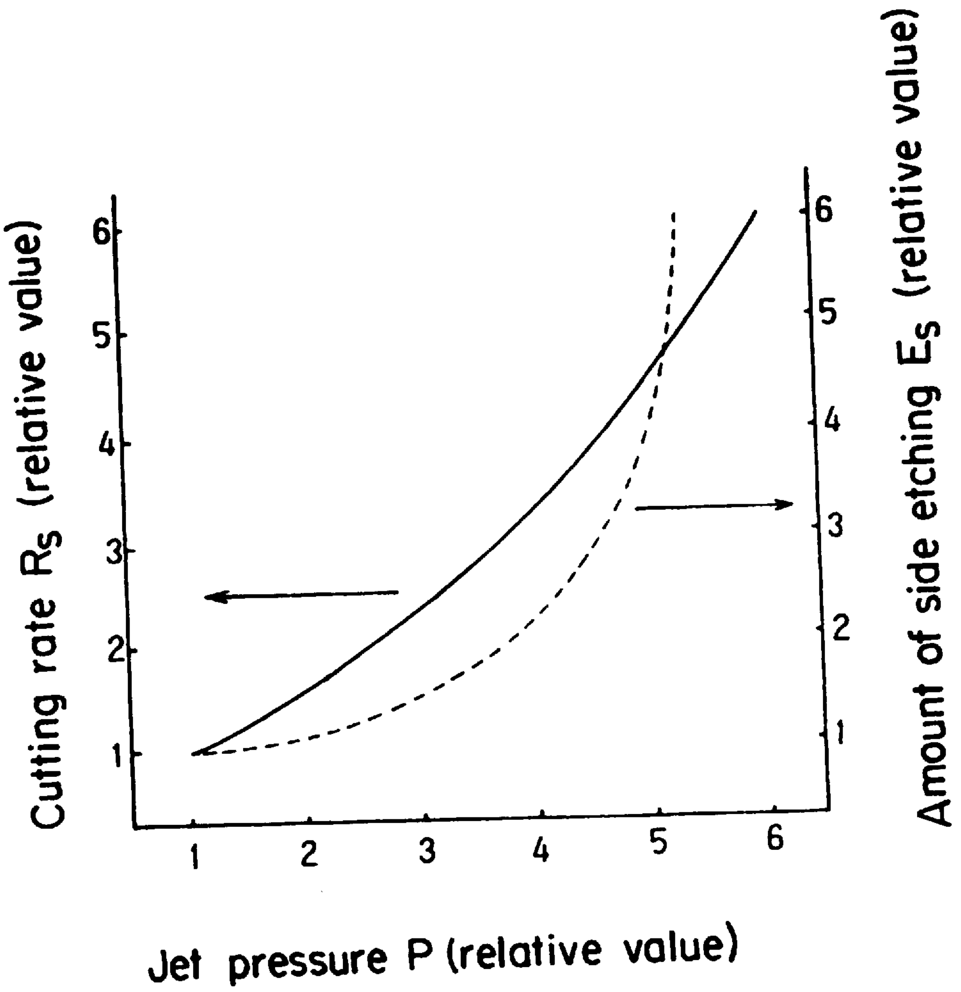
FIG. 11 (PRIOR ART)
FIG. 11 is a characteristic chart showing the relationship between the jet pressure of a sand blasting device having a jet gun according to the prior art and the cutting rate of a rib paste and the amount of side etching of partition walls.
Figure 12:
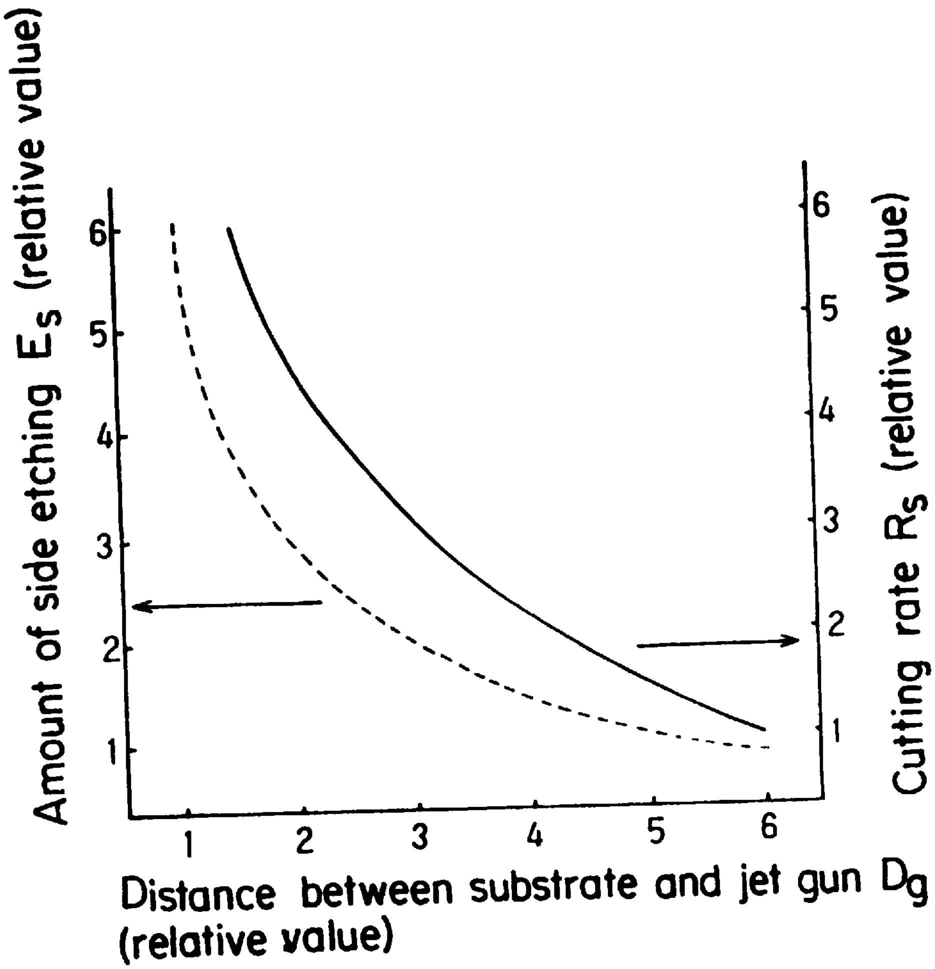
FIG. 12(PRIOR ART)
FIG. 12 is a characteristic chart showing the relationship between the jet distance of the sand blasting device having a jet gun according to the prior art and the cutting rate of a rib paste and the amount of side etching of partition walls.
Figure 13A:
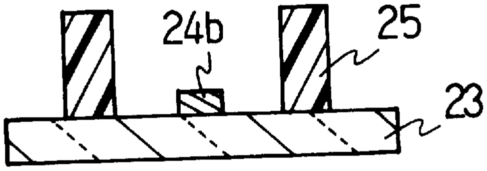
FIGS. 13(*a*) and 13(*b*) are sectional views showing the ideal state of side etching of the partition walls and an example of the actual state according to the prior art.
Figure 13B:
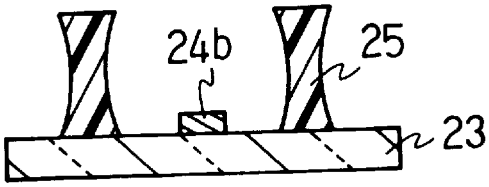
FIG. 13(b) (PRIOR ART)

According to the experiments of the first to fourth embodiments, the discharge cell of the gas discharge display unit has an opening dimension of 550 μm×450 μm and a partition wall height of 200 μm. FIG. 7 shows the comparison of the relationship between the amount of side etching of the partition wall and the throughput of the gas discharge display unit according to the present embodiment with the relationship between the amount of side etching of the partition wall and the throughput of the gas discharge display unit according to the prior art. According to the method for forming partition walls according to the prior art as shown in FIG. 7, when the throughput of the manufacturing apparatus is increased, the amount of side etching of the partition wall is increased. According to the gas discharge display unit of the present embodiment, the partition wall has very high dimensional precision irrespective of the throughput of the manufacturing apparatus. In addition, the amount of side etching of the partition wall is controlled to be very small even if the throughput of the manufacturing apparatus is increased. As a result, the mass production of the gas discharge display unit is enhanced.

While the first to fourth embodiments show a change in one of the jetting conditions of each jet gun to vary the cutting rates thereof, a plurality of conditions of each jet gun may be changed to vary the cutting rates thereof. In this case, it is required that the cutting rates of the jet guns 16*a*, 16*b*, 16*c* and 16*d* are decreased in this order.

While the case where the sand blasting device comprising four jet guns 16*a*, 16*b*, 16*c* and 16*d* is used has been described in the present embodiment, 2 to 10 jet guns can be used. The number of the jet guns can be properly changed depending on the size of the gas discharge display unit, the purpose of use, the shape of the discharge cell and the like.

While the examples of the DC gas discharge display unit have been described in the first to third embodiments, the present invention is not limited thereto. Also in the case where the present invention is applied to an AC gas discharge display unit, the same effects can be obtained.

The invention may be embodied in other forms without departing from the spirit or essential characteristics thereof. The embodiments disclosed in this application are to be considered in all respects as illustrative and not restrictive, the scope of the invention is indicated by the appended claims rather than by the foregoing description, and all changes which come within the meaning and range of equivalency of the claims are intended to be embraced therein.

What is claimed is:

1. A method for manufacturing a gas discharge display unit having a first substrate, a first electrode formed on said first substrate, a second substrate opposed to said first substrate, a second electrode formed on said second substrate, and partition walls formed between said first and second substrates to form discharge cells, comprising the steps of:

forming said second electrode on said second substrate;

forming an insulating layer on said second substrate on which said second electrode has been provided;

forming a mask pattern having sand blasting resistance on an upper face of said insulating layer; and forming partition walls by removing said insulating layer on a portion where said mask pattern is not provided by means of a sand blasting device having a plurality of jet guns while controlling the cutting rates of at least two jet guns of the plurality of jet guns to be different from each other, the portion where the mask pattern is not provided being treated by the plurality of jet guns.

2. The method as defined in claim 1, further comprising the step of forming an insulating film on said second substrate before forming an insulating layer so that said insulating layer is formed on said insulating film.

3. The method as defined in claim 1, wherein said second electrode includes an anode bus, an anode electrode connected to said anode bus through a resistor, and a display electrode formed on said anode electrode, further comprising the step of forming an insulating film on said second substrate except for said display electrode so that the insulating layer is formed on said insulating film.

4. The method as defined in claim 1, wherein the insulating layer is formed of first, second and third insulating layers laminated sequentially from the second substrate side.

5. The method as defined in claim 4, wherein the first insulating layer made of a material whose main components are 1.0 to 3.0% by weight of a resin binder and a glass frit, the second insulating layer made of a material whose main components are 0.5 to 1.5% by weight of a resin binder and a glass frit, and the third insulating layer made of a material whose main components are 2.0 to 5.0% by weight of a resin binder and a glass frit are laminated and sintered at a predetermined temperature.

6. The method as defined in claim 4, wherein said first insulating layer is formed with a thickness of 5 to 15 μm, said second insulating layer is formed with a thickness of 100 to 250 μm, and said third insulating layer is formed with a thickness of 5 to 30 μm.

7. The method as defined in claim 4, wherein said second insulating layer is formed by laminating a plurality of insulating layers.

8. The method as defined in claim 4, wherein said third insulating layer is made of a black material.

9. The method as defined in claim 1, wherein the jet pressures of at least two jet guns of said plurality of jet guns are different from each other.

10. The method as defined in claim 1, wherein the nozzle calibers of at least two jet guns of said plurality of jet guns are different from each other.

11. The method as defined in claim 1, wherein the distances between the nozzle tips of said at least two of said plurality of jet guns and the surface substance on said substrate are different from each other.

12. The method as defined in claim 1, wherein the average particle sizes of abrasive particles jetted from at least two of said plurality of jet guns are different from one another.

13. The method as defined in claim 1, wherein the second substrate is moved relative to the sand blasting device in a first direction, the sand blasting device comprises a plurality of jet nozzles arranged in said first direction, and the jet nozzles of the plurality of jet nozzles have different cutting rates, the cutting rates decreasing for jet nozzles positioned downstream in the first direction.

* * * * *